(12) United States Patent
Kuwert (10) Patent No.: US 7,057,317 B2
(45) Date of Patent: Jun. 6, 2006

(54) ELECTRIC MOTOR

(75) Inventor: Oswald Kuwert, Tutschfelden (DE)

(73) Assignee: Minebea Co., Ltd., Miyota-machi (JP)

( * ) Notice: Subject to any disclaimer, the term of this patent is extended or adjusted under 35 U.S.C. 154(b) by 100 days.

(21) Appl. No.: 10/801,214

(22) Filed: Mar. 15, 2004

(65) Prior Publication Data

US 2004/0183386 A1 Sep. 23, 2004

(30) Foreign Application Priority Data

Mar. 19, 2003 (DE) ................... 103 12 869

(51) Int. Cl.
*H02K 5/00* (2006.01)
(52) U.S. Cl. .................. 310/89; 310/68 B; 310/91
(58) Field of Classification Search .......... 310/89, 310/91, 68 R, 68 B, 71, 68 C
See application file for complete search history.

(56) References Cited

U.S. PATENT DOCUMENTS

| | | | |
|---|---|---|---|
| 3,932,930 A | 1/1976 | Dochterman | |
| 4,357,552 A | 11/1982 | MacMillan | |
| 4,612,468 A * | 9/1986 | Sturm et al. ............... | 310/67 R |
| 4,644,204 A * | 2/1987 | Lakin ............................ | 310/89 |
| 4,847,528 A | 7/1989 | Eguchi et al. | |
| 5,747,903 A * | 5/1998 | Klingler ................... | 310/75 R |
| 5,939,807 A * | 8/1999 | Patyk et al. ................... | 310/89 |
| 2003/0178903 A1 | 9/2003 | Rapp | |
| 2003/0222525 A1 | 12/2003 | Rapp et al. | |

FOREIGN PATENT DOCUMENTS

| | | |
|---|---|---|
| DE | 26 30 518 | 1/1978 |
| DE | 100 34 302 | 2/2002 |
| DE | 100 51 403 | 6/2002 |
| DE | 101 30 118 | 1/2003 |
| EP | 0 438 334 | 7/1991 |
| JP | 58-133139 | 8/1983 |
| JP | 3-1319138 | * 10/1989 |

OTHER PUBLICATIONS

*Patent Abstracts of Japan*, Abstract of Japanese Patent "PUMP", Publication No. 2000324744, Nov. 24, 2000, Japanese Application No. 11125927, Filed May 6, 1999.

(Continued)

*Primary Examiner*—Tran Nguyen
(74) *Attorney, Agent, or Firm*—Lipsitz & McAllister, LLC (57) ABSTRACT

In order in the case of an electric motor, in particular a brushless electric motor, comprising a rotor, a stator, a motor housing receiving the rotor and the stator, a first bearing, disposed on the motor housing, and a second bearing, disposed opposite the first bearing, to allow the bearings to be positioned with the necessary precision when the rotor is being fitted into the motor housing, it is proposed that the motor housing comprises a housing body, which receives the stator, and a flange body, which receives the second bearing and can be mounted on the housing body, and that the flange body, when it is in an axial end position in relation to the rotor axis, is guided on the housing body against a movement transversely to the rotor axis and is fixed in relation to the housing body against a movement in the direction of the rotor axis by means of first positively connecting features, provided on the flange body, and second positively connecting features, provided on the housing body, which features can be brought into operative connection with one another by a relative movement of the flange body and housing body.

32 Claims, 5 Drawing Sheets

OTHER PUBLICATIONS

*Patent Abstracts of Japan*, Abstract of Japanese Patent "Brushless Motor", Publication No. 08251895, Sep. 27, 1996, Japanese Application No. 07070870, Filed Mar. 3, 1995.

*Patent Abstracts of Japan*, Abstract of Japanese Patent "Resin Molded Motor", Publication No. 56091645, Jul. 24, 1981, Japanese Application No. 54169820, Filed Dec. 25, 1979.

*Patent Abstracts of Japan*, Abstract of Japanese Patent "Step Motor", Publication No. 61018325, Jan. 27, 1986, Japanese Application No. 59138178, Filed Jul. 3, 1984.

*Patent Abstracts of Japan*, Abstract of Japanese Patent "Resin Molded Motor", Publication No. 56088642, Jul. 18, 1981, Japanese Application No. 54164481, Filed Dec. 17, 1979.

* cited by examiner

ELECTRIC MOTOR

The present disclosure relates to the subject matter disclosed in German application No. 103 12 869.7 of Mar. 19, 2003, which is incorporated herein by reference in its entirety and for all purposes.

BACKGROUND OF THE INVENTION

The invention relates to an electric motor, in particular a brushless electric motor, comprising a rotor, a stator, a motor housing receiving the rotor and the stator, a first bearing, disposed on the motor housing on a first side of the rotor, and a second bearing, disposed on a second side of the rotor lying opposite the first side, for the rotatable mounting of the rotor about a rotor axis.

Such electric motors are known from the prior art.

With them there is the problem when the motor is being assembled, in particular when the rotor is being fitted into the motor housing, of being able to position the bearings with the necessary precision, in particular with regard to the spacing in the direction of the rotor axis.

SUMMARY OF THE INVENTION

This problem is solved in the case of an electric motor of the type described at the beginning according to the invention by the motor housing comprising a housing body, which receives the stator, and a flange body, which receives the second bearing and can be mounted on the housing body, and by the flange body, when it is in an axial end position in relation to the rotor axis, being guided on the housing body against a movement transversely to the rotor axis and being fixed in relation to the housing body against a movement in the direction of the rotor axis by means of first positively connecting features, provided on the flange body, and second positively connecting features, provided on the housing body, which features can be brought into operative connection with one another by a relative movement of the flange body and housing body.

The advantage of the solution according to the invention can be seen in that it provides the possibility, when assembling the motor housing, of on the one hand easily mounting the second bearing on the housing body and on the other hand disposing it in relation to the first bearing in a position required for precision mounting and guidance of the rotor.

In particular, the solution according to the invention is advantageous whenever the bearings are to be mounted on the motor housing such that they are biased in relation to one another by an elastic energy store, that is to say acted upon in the direction of one another.

With regard to the forming of the positively connecting features themselves, a wide variety of possibilities are conceivable.

For example, the two positively connecting features could be interacting threads.

A particularly advantageous solution provides that the positively connecting features are formed in such a way that they can be brought into engagement with one another by a relative movement with respect to one another in the direction of the rotor axis.

Furthermore, it is advantageously provided that the positively connecting features are formed in such a way that they can be fixed relative to one another against a movement in the direction of the rotor axis by a turning movement relative to one another about the rotor axis.

A commonly used form for such positively connecting features provides that they interact in the manner of a bayonet fastener.

With regard to simplest possible production of such positively connecting features, an advantageous solution provides that the one positively connecting features are formed by path followers and the other positively connecting features are formed by guide paths for the path followers.

In the case of the solution according to the invention, the positively connecting features could in principle be formed in such a way that various axial end positions of the flange body in relation to the housing body can be fixed by them.

It is particularly advantageous, however, if a single axial end position of the flange body in relation to the housing body can be fixed by the positively connecting features.

It is particularly advantageous if the positively connecting features are formed in such a way that, in the axial end position, the flange body can be turned in relation to the housing body without changing this axial end position.

To allow the axial end position to be reached as easily as possible when mounting the flange body, the flange body can be brought into the axial end position while being guided by guiding elements acting parallel to the rotor axis.

With regard to the way in which the flange body is disposed in relation to the housing body, no details have been given so far. For example, the form taken could be such that the flange body can be placed against one side of the housing body, for example in the manner of a covering engaging over this side.

A solution that is particularly advantageous in structural terms provides that the flange body can be inserted into an opening in the housing body.

In the case of such a solution, the guiding elements can be formed particularly advantageously by being formed by a circumferential surface of the flange body and an inner surface of the opening, facing the flange body.

Furthermore, there is the possibility of forming the second positively connecting features in such a way that they are disposed at the opening in the housing body receiving the flange body.

The positively connecting features are in this case preferably disposed in the housing body in the region of an inner surface of the opening, facing the inserted flange body.

In the case of this solution, there is also the possibility of forming the first positively connecting features in such a way that they are disposed on a side of the flange body facing the opening.

In this case, the first positively connecting features are preferably disposed on the circumferential surface of the flange body.

In connection with the forming of the housing body in such a way that the flange body can be inserted into an opening in the same, no details have been given so far concerning the function of the opening. For example, the opening could merely be an opening of a recess provided in the housing body for receiving the flange body.

A particularly suitable solution, which offers advantages in particular when the electric motor according to the invention is being assembled, provides that the opening is an access opening for an interior space of the housing, with the result that the opening can at the same time be used during the assembly of the electric motor to gain access to the interior space of the housing body.

In this connection it is particularly suitable if the opening in the housing body is dimensioned in such a way that the rotor can be inserted through it into the motor housing.

In particular whenever the motor is to be mounted in the motor housing by two bearings acted upon in the direction of one another, it is provided in the case of a preferred exemplary embodiment of the solution according to the invention that the second bearing is supported in the axial direction on the flange body by means of a resilient element, with the result that, when the axial end position of the flange body is reached, the resilient element is prestressed and the second bearing is acted upon by this prestressing in the direction of the first bearing.

Such a solution can be realized particularly advantageously by the flange body having a receptacle for the second bearing, in which the second bearing is movable in the axial direction with respect to the rotor axis in relation to the flange body.

The receptacle for the second bearing could be a receptacle additionally disposed on the flange body.

A particularly simple solution in structural terms provides that the receptacle for the second bearing is formed as a hollowing-out provided in the flange body.

In connection with the description so far of exemplary embodiments of the electric motor according to the invention, it has not been stated in detail where a sensor by which the rotational movements and rotational positions of the rotor are to be sensed can be disposed.

For this reason, a particularly advantageous exemplary embodiment provides that at least one sensor sensing rotational movements of the rotor is disposed on a side of the flange body facing the rotor.

Such a disposition of the sensor improves the ease with which the electric motor according to the invention can be mounted.

The sensor could in principle be any kind of sensor by which the rotational movements of the rotor can be sensed. A particularly advantageous solution provides that the at least one sensor is formed as a magnetic field sensor facing sensor magnets of the rotor, such a magnetic field sensor being, for example, a Hall sensor or magnetoresistive sensor.

Such a sensor could be disposed, for example, on the housing body.

A particularly advantageous solution provides that a sensor board with the at least one sensor is disposed on a side of the flange body facing the rotor.

Such a sensor board could be placed for example into the housing body. It is particularly advantageous, however, if the sensor board can be simultaneously turned at least with the flange body and there is consequently the possibility, by turning the flange body, of adjusting the sensor board with regard to its rotational position in relation to the stator and rotor.

The sensor board can be adjusted and positioned particularly advantageously if the sensor board is fixedly connected to the flange body, since in this way the axial end position of the flange body can also be used at the same time to fix the axial end position of the sensor plate in a defined manner.

The sensor board is in this case preferably connected to the flange body by means of positively connecting elements.

To allow the sensor board to be disposed as close as possible to the rotor, and on the other hand to allow an advantageous receptacle for the second bearing to be realized on the flange body, it is preferably provided that the second bearing is disposed on the flange body on a side of the sensor board facing away from the rotor.

Easy mounting of the electric motor according to the invention also presupposes that an electrical connection from the outside to the sensor board can be created in a simple way. This can be realized particularly advantageously by a cable leading away from the sensor board being led through a cut-away portion in the flange body.

To allow this cable to be introduced into the cut-away portion in a simple way during the mounting of the sensor board on the flange body, it is preferably provided that the cut-away portion is open toward an outer side of the flange body.

In the case of the embodiments described so far of the electric motor according to the invention, nothing has been stated concerning the extent to which the flange body is fixed in relation to the housing body in the axial end position after adjusting the at least one sensor.

In order to maintain the adjustment of the at least one sensor that can be achieved by turning the flange body for example, it is preferably provided that the flange body can be fixedly connected to the housing body, there being various ways in which such a fixed connection between the flange body and the housing body can be realized.

A particularly simple solution provides that the fixed connection between the flange body and the housing body takes place by adhesive bonding. It would also be conceivable, however, to provide a screw connection or similar connections that permanently fix the position of the flange body with respect to the housing body.

Furthermore, no details have been given with regard to the way in which the first bearing is disposed on the housing body. It is particularly advantageous if the housing body has on a side lying opposite the flange body a bearing flange receiving the first bearing.

This bearing flange could for its part be able to be mounted separately on the housing body.

The solution according to the invention can be realized at particularly low cost, however, if the bearing flange is connected integrally to the housing casing of the housing body, with the result that, when the electric motor according to the invention is being assembled, the measures according to the invention merely have to be used to achieve an exact positioning of the second bearing in relation to the housing body.

In the case of a version of the electric motor according to the invention that is advantageous in production engineering terms, it is provided that the housing body is formed from a cured composition embedding the stator, with the result that the form of the housing body itself can be produced by simple production processes, such as pouring of the curing composition into a mold or injection of the curing composition into a mold.

Further features and advantages of the invention are the subject of the description which follows and of the graphic representation of several exemplary embodiments.

DETAILED DESCRIPTION OF THE INVENTION

Figure 1:
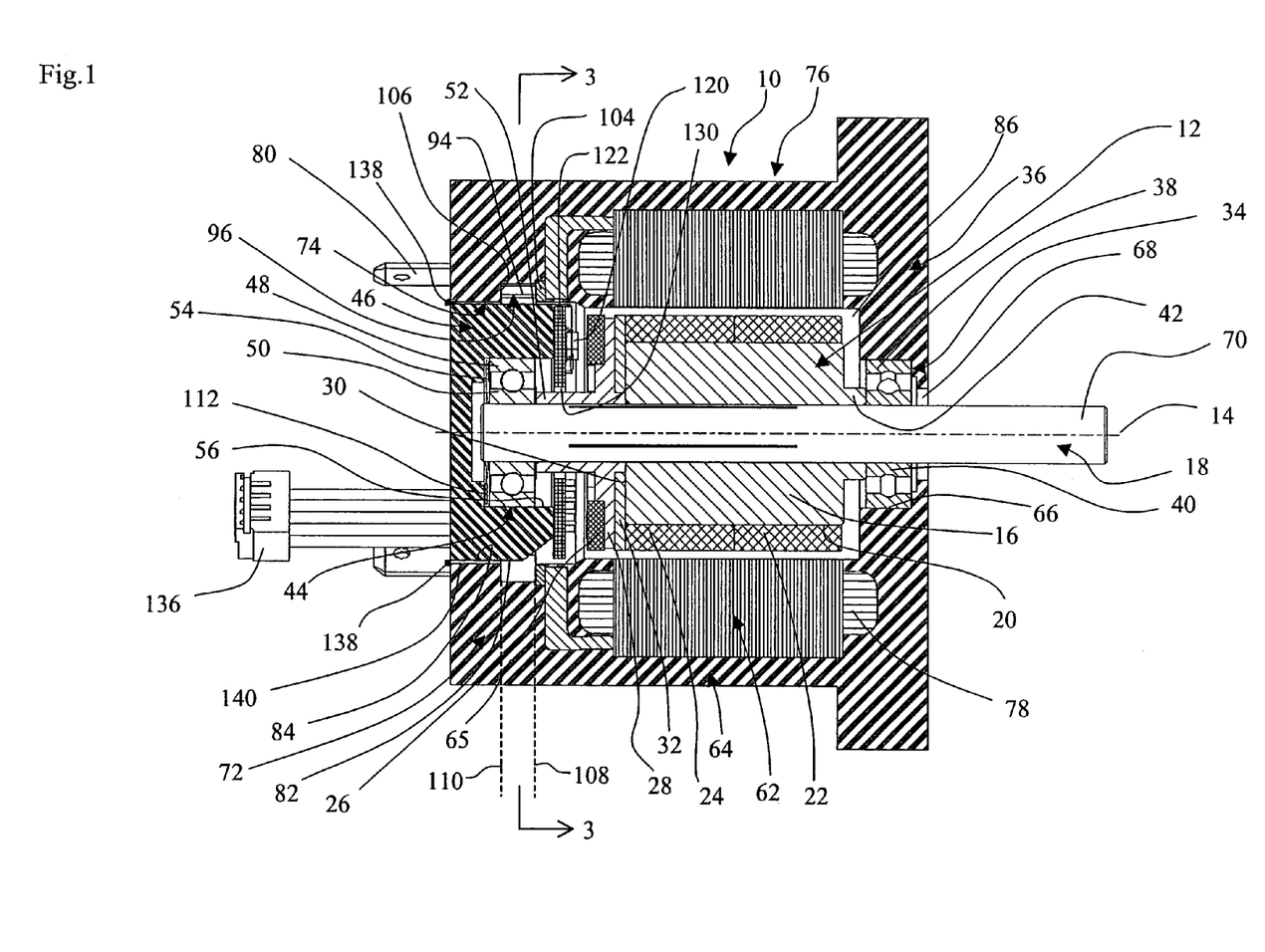
FIG. 1 shows a longitudinal section through an electric motor according to the invention in the assembled state.
Figure 2:
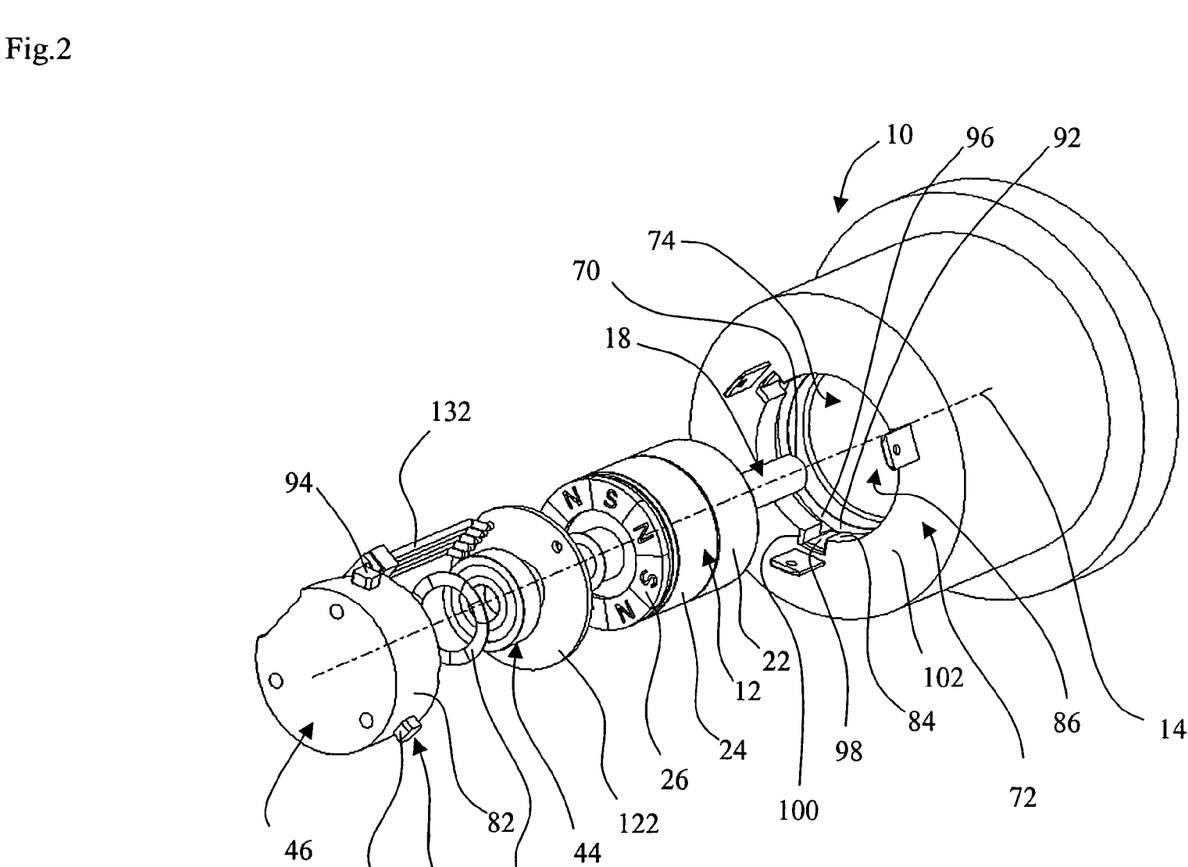
FIG. 2 shows an exploded representation of the electric motor according to the invention before fitting of a rotor and a flange body.
Figure 3:
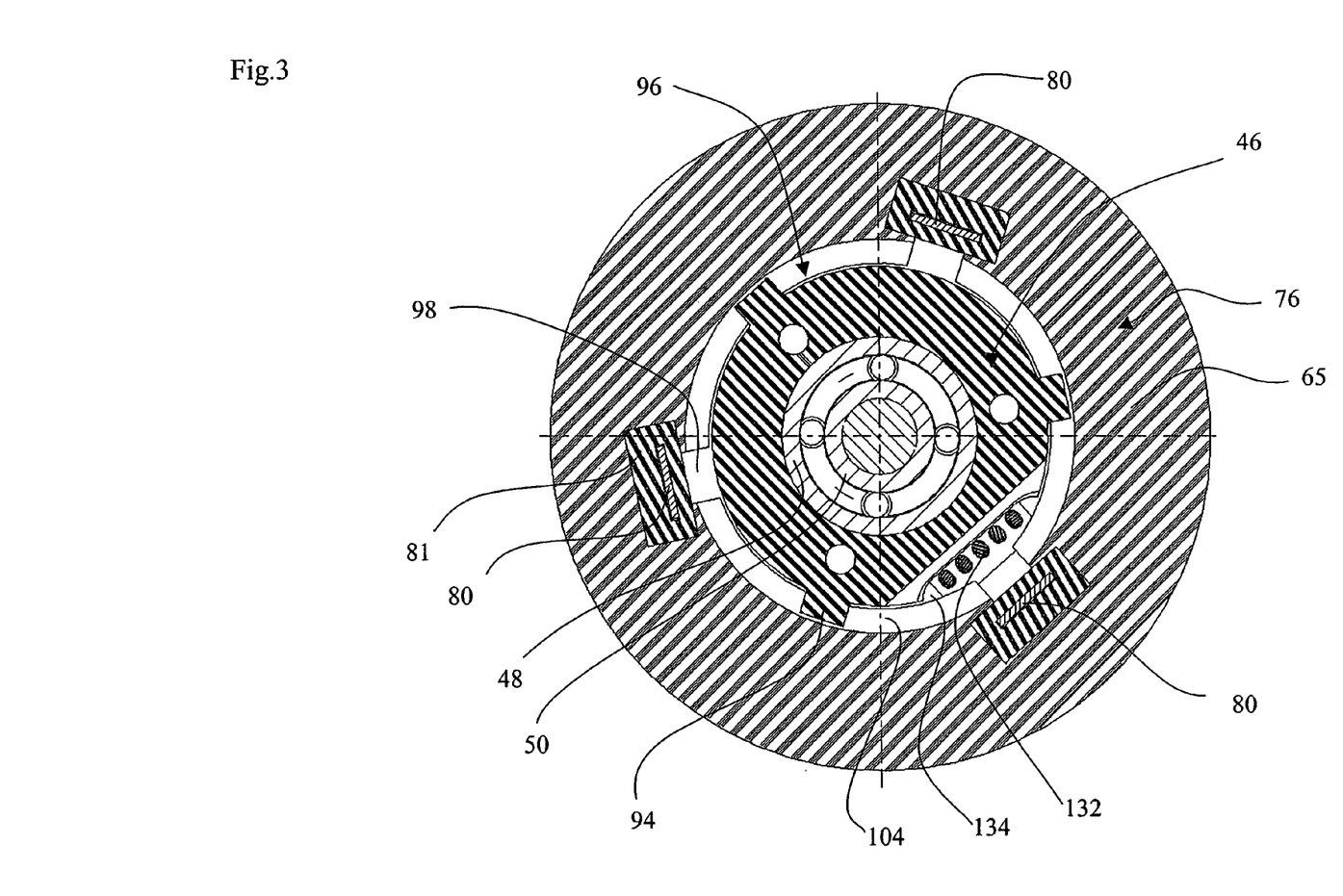
FIG. 3 shows a section along line 3—3 in FIG. 1.

An exemplary embodiment of a brushless electric motor according to the invention, as represented in FIGS. 1, 2 and 3, comprises a motor housing 10, in which a rotor, designated as a whole by 12, is mounted rotatably about a rotor axis 14.

The rotor 12 is in this case formed by a rotor body 16, which is seated on a rotor shaft 18, rotatable coaxially with respect to the rotor axis 14, and carries magnetic poles 22, 24, which are disposed on an outer surface 20 and are usually disposed as pairs of magnetic poles on the rotor body 16, the rotor body 16 forming a return circuit body for the magnetic poles 22, 24.

Furthermore, the rotor 12 is provided with a sensor magnet disk 26, which for its part is seated on a return circuit body 28, which is likewise disposed on the rotor shaft 18 and is disposed for example in front of a rear end face 30 of the rotor body 16, a shielding ring 32 being additionally provided between the return circuit body 28 and the rotor body 16 as well as the magnetic poles 24.

The return circuit body 28 and the sensor magnet disk 26 have in this case a radial extent which corresponds at most to the radial extent of the magnetic poles 22, 24 in relation to the rotor axis 14.

The mounting of the rotor 12 takes place, as represented in FIG. 1, by means of a first bearing 34, the outer bearing ring 38 of which is held in a front bearing flange 36 of the motor housing 10, while an inner bearing ring 40 is seated on the rotor shaft 18. Furthermore, the inner bearing ring 40 of the first bearing engages against a continuation 42, extending in a sleeve-like manner from the rotor body 16, and consequently supports the rotor 12 also in the direction parallel to the rotor axis 14.

Furthermore, the rotor 12 is rotatably mounted in the motor housing 10 on a side lying opposite the first bearing 34 by a second bearing 44, which is disposed in a flange body 46 (to be described in more detail below) of the motor housing 10, which is disposed on a side of the motor housing 10 lying opposite the front bearing flange 36. In this case, the second bearing 44 has an outer bearing ring 48 and an inner bearing ring 50, the inner bearing ring 50 likewise being seated on the rotor shaft 18. Supported on the inner bearing ring 50 is a sleeve-like continuation 52, which is formed for example as a continuation 52 of the return circuit body 28 of the sensor magnet disk 26 and extends from the rear end face 30 of the rotor body 16 up to the inner bearing ring 50.

The fact that the sleeve-like continuation 52 is supported on the rotor body 16 and the rotor body 16 for its part has the sleeve-like continuation 42, which engages against the inner bearing ring 40 of the first bearing 34, means that the inner bearing rings 40 and 50 are positioned by the rotor 12 with a fixed predetermined spacing in the direction of the rotor axis 14.

Figure 4:
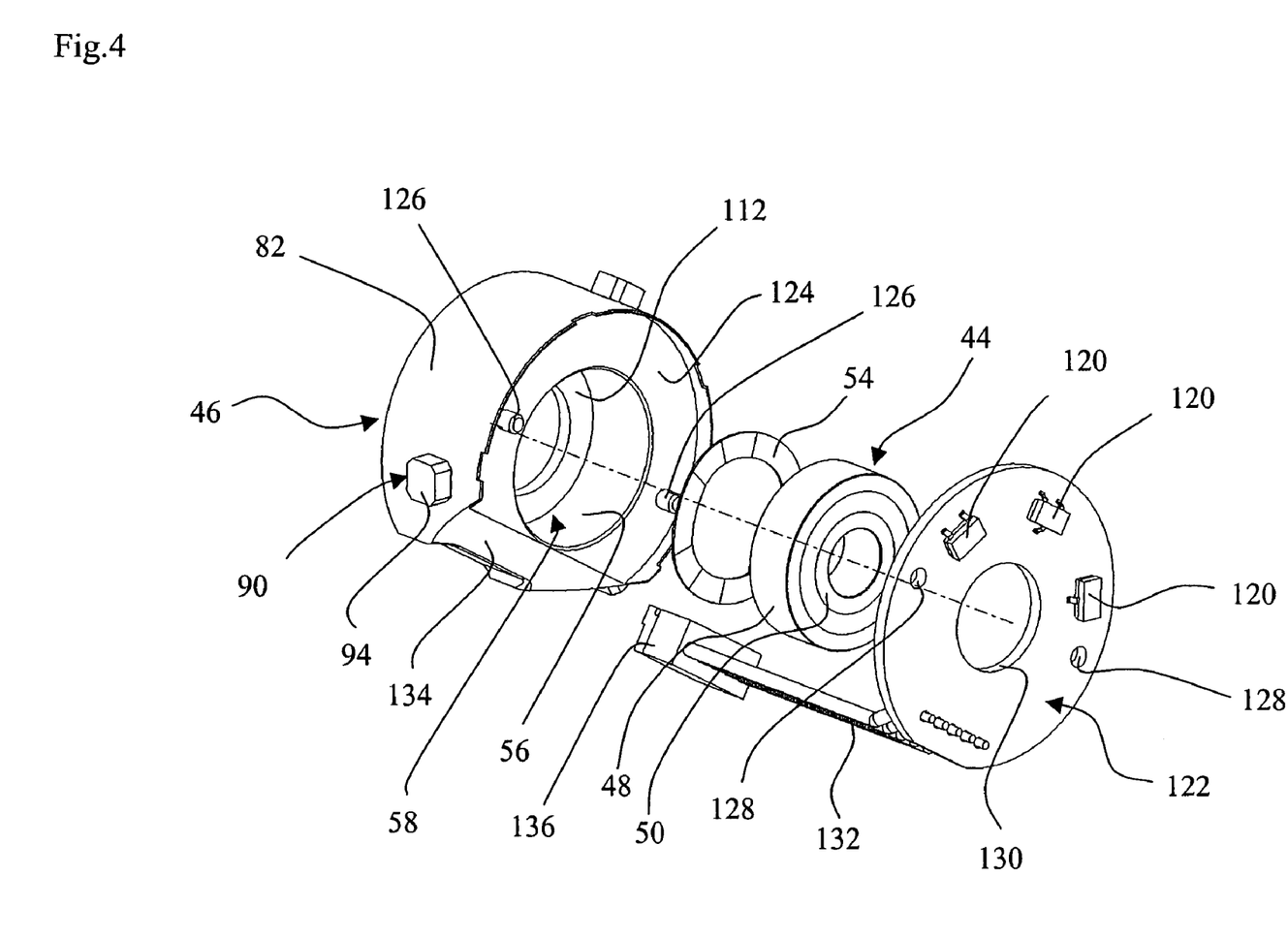
FIG. 4 shows a further-enlarged exploded representation of a flange body before fitting of a second bearing and a sensor board and FIG. 5 shows a perspective representation of a flange body provided with the sensor board and the second bearing.

Furthermore, one of the bearings 34, 44, for example the second bearing 44, is preferably acted upon in the direction parallel to the rotor axis 14 by a resilient ring 54, which is supported on the one hand on the flange body 46 and on the other hand on the outer bearing ring 48 of the second bearing 44, the outer bearing ring 48 being guided for this purpose such that it can be displaced in the direction of the rotor axis 14 in a cylindrical bearing receptacle 56 of the flange body 46, formed as a hollowing-out 58 (FIG. 4) in the flange body 46 that is disposed in the flange body and open toward the rotor body 16, but aligned in such a way that it is always centered with respect to the rotor axis 14, with the result that by virtue of the resilient ring 54, the two bearings 34, 44 experience constant application of a force in the direction parallel to the rotor axis 14 and they consequently run in a manner substantially free from play.

Also held in the motor housing 10 is a stator 62 disposed around the rotor 12, the motor housing 10 preferably being formed from a cured embedding composition 65 of plastic, in which the stator 62 is embedded.

The embedding composition 65 also forms a housing casing 64, which radially encloses the stator 62 on the outside, and also the front bearing flange 36, which is preferably formed integrally onto the housing casing 64, with a receptacle 66 for the first bearing 34 and an aperture 68, through which a first end 70 of the rotor shaft 18 protrudes.

Also formed onto the housing casing 64 on the side lying opposite the front bearing flange 36 is a flange body receptacle 72, which receives the flange body 46 by the flange body 46 being able to be inserted into an opening 74 in the flange body receptacle 72.

The flange body receptacle 72, the housing casing 64 and the front bearing flange 36 altogether form a unitary one-piece housing body 76, which has the aperture 68 for the front end 70 of the rotor shaft 18 and the opening 74 as the only openings, of which the opening 74 can be closed by the flange body 46 that can be inserted into it, with the result that, when the flange body 46 is inserted in the opening 74, the motor housing 10 is closed on all sides with the exception of the aperture 68.

For supplying current to windings 78 of the stator 62, winding terminals 80 coming from the motor housing 10 are provided, preferably in the region of the flange body receptacle 72, for example in the form of terminal lugs projecting beyond the flange body receptacle 72, the winding terminals 80 and leads running between the winding terminals 80 and the windings 78 likewise being embedded in the flange body receptacle 72 by an embedding composition 81 (FIG. 3).

As represented in FIGS. 1 and 2, the flange body 46 is preferably formed as a body with a cylindrical circumferential surface 82, which is coaxial with respect to the rotor axis 14 and can be made to engage against a cylindrical inner surface 84 of the opening 74 that likewise runs coaxially with respect to the rotor axis 14 of the electric motor, the flange body 46 being able to be introduced into the opening 74 of the flange body receptacle 72 by the circumferential surface 82 and the inner surface 84, which both act as guiding elements, being guided coaxially with respect to the rotor axis 14.

As represented in FIG. 2, the opening 74 for receiving the flange body 46 has such a diameter, seen radially with respect to the rotor axis 14, that the entire rotor 12 can be introduced through the opening 74 into an interior space 86 of the motor housing 10 from the side of the flange body receptacle 72, the front end 70 of the rotor shaft 18 being able to be pushed through the aperture 68 in the front bearing flange 36 from the interior space 86 of the motor housing 10 outward, and thereby passing through the inner bearing ring 40 of the first bearing 34.

For fixing the flange body 46 in the opening 74 of the flange body receptacle 72, the flange body 46 is provided with first positively connecting features 90 and the flange body receptacle 72 is provided with second positively connecting features 92.

The first positively connecting features 90 are in this case for example pins 94 projecting radially beyond the circumferential surface 82, while the second positively connecting features 92 form receptacles for the pins 94, to be precise an annular groove 96 which runs around the opening 74 in the form of a ring around the rotor axis 14, is recessed with respect to the inner surface 84 and from which there run parallel to the rotor axis 14 introduction grooves 98, which on the one hand are likewise open toward the inner surface 84 and on the other hand form on a rear side 102 of the flange body receptacle 72 an introduction opening 100, through which the pins 94 can be introduced in the first instance into the introduction grooves 98 and then from the introduction grooves 98 into the annular groove 96.

The pins 94 have in this case such an extent in the direction of the rotor axis 14 that they lie in a substantially exactly guided manner between opposing side walls 104 and 106 of the annular groove 96, and consequently an exact positioning of the flange body 46 in the direction of the rotor axis 14 in relation to the housing body 76 takes place in its axial end position with respect to the rotor axis 14 (FIGS. 1 and 3) by the annular groove 96 together with the pins 94.

The side walls 104 and 106 preferably form guiding surfaces lying in planes 108 and 110 that are parallel to one another, perpendicular orientation of the planes 108 and 110 with respect to the rotor axis 14 having the effect that movement of the pins 94 in the annular groove 96 does not lead to any displacement of the flange body 46 in the direction of the rotor axis 14—apart from the process of introducing the pins 94 into the annular groove 96—with the result that the flange body 46 is adjustable with regard to its rotational position in relation to the flange body receptacle 72 while maintaining its axial end position in relation to the rotor axis 14 (FIG. 1 and FIG. 3).

The exact axial end position of the flange body 46 in relation to the housing body 76 also has the effect that the resilient ring 54, which is supported on an annular surface 112 of the flange body 46, can be exactly positioned in such a way that it acts upon the outer bearing ring 48 of the second bearing 44 with a substantially constant force, in order in this way to keep the unit comprising the second bearing 44, the rotor 12 and the first bearing 34 in the motor housing 10 by this force applied in the direction of the rotor axis 14.

The rotatability of the flange body 46 in relation to the receptacle 72 that is required in addition to the exact axial end position of said flange body with respect to the rotor axis 14 is required to allow magnetic field sensors 120 on a sensor board 122 to be positioned exactly with respect to the stator 62 and the rotor 12, the sensor board 122 lying on a front side 124 of the flange body 46 facing the rotor 12 and being held rotationally fixed in relation to the flange body 46 by positioning pins 126 of the flange body 46, which engage in corresponding recesses 128 in the sensor board 122.

With the flange body 46 inserted in the flange body receptacle 72, this allows the entire sensor board 122 to be positioned in the axial end position in such a way that the magnetic field sensors 120 are disposed with a defined spacing opposite the sensor magnet disk 26, and to be adjusted exactly in relation to the stator 62 by turning about the rotor axis 14, in order to sense exactly rotational positions of the sensor magnet disk 26, and consequently rotational positions of the rotor 12, in relation to the motor housing 10 (FIG. 1).

To have sufficient installation space available on the sensor board 122, the sensor board 122 is provided with a central aperture 130, through which the rotor shaft 18 reaches, in order to pass through the inner bearing ring 50 of the second bearing 44, which is seated in the bearing receptacle 56, which extends as a hollowing-out 58 from the front side 124 into the flange body 46, with the result that the second bearing 44 is disposed on a side of the sensor board 122 facing away from the rotor body 16.

For the electrical contacting of the sensor board 122, a ribbon cable 132 leads from the latter via a corresponding cut-away portion 134 that is in the flange body 46 and open toward the circumferential surface 82 to a plug-in connector 136 lying outside the motor housing 10.

Figure 5:
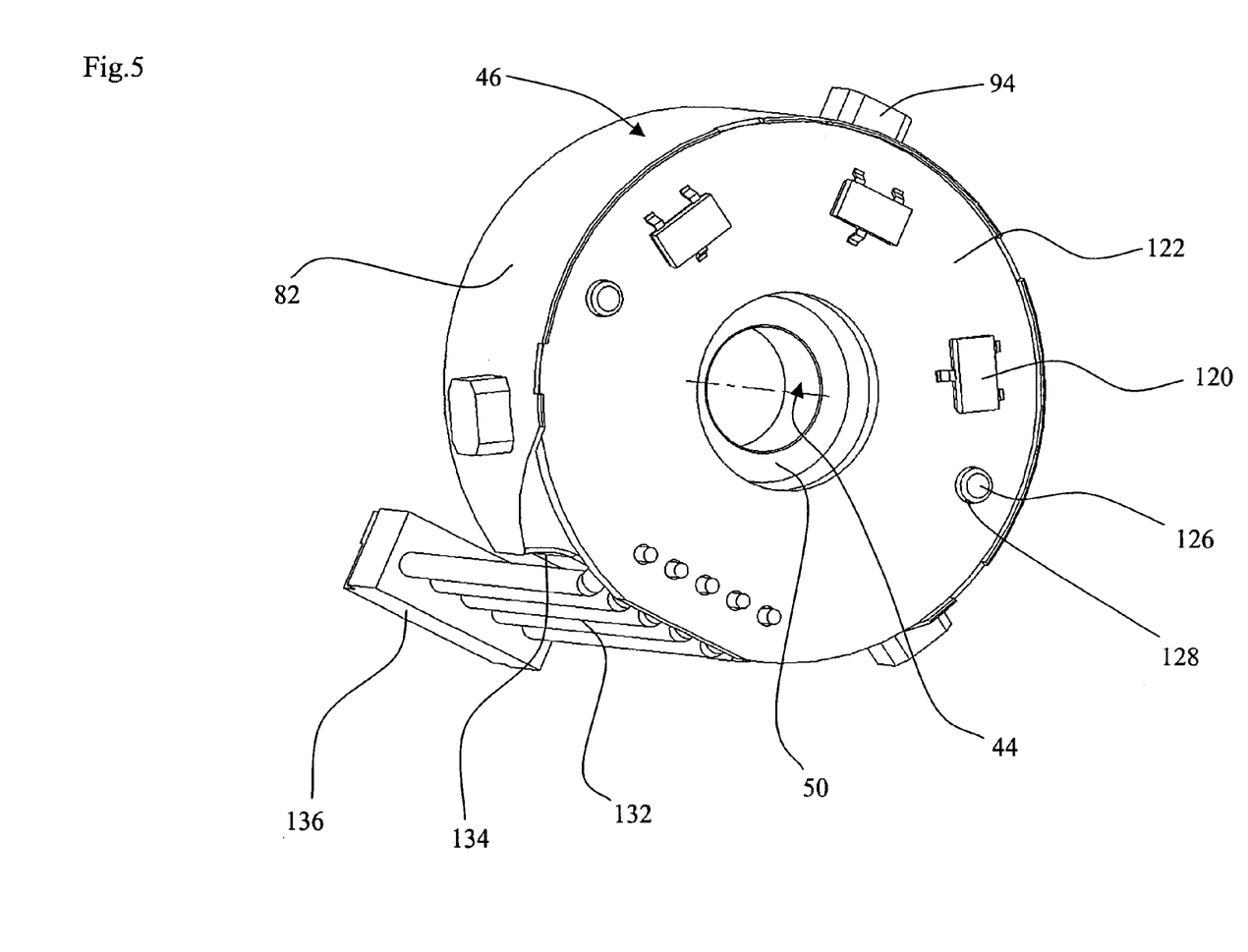

When the electric motor according to the invention is being assembled, the flange body 46 is in the first instance provided with the second bearing 44, the spring ring 54 being inserted into the bearing receptacle 56 first, followed by insertion of the second bearing 44. Subsequently, the sensor board 122 is mounted in a rotationally fixed manner on the flange body 46 by the positioning pins 126 being brought into engagement with the recesses 128 in the sensor board 122 and the sensor board 122 being placed on the front side 124 of the flange body 46 and secured. Furthermore, the ribbon cable 132 is placed into the cut-away portion 134 from an outer side (FIG. 5).

The assembled unit comprising the flange body 46, the second bearing 44 and the sensor board 122 with the magnetic field sensors 120 can be placed onto the rotor shaft 18 via the opening 74 before introduction of the rotor 12 into the housing body 76, in such a way that said rotor shaft passes through the inner bearing ring 50 of the second bearing 44, and consequently the flange body 46 is already aligned coaxially with respect to the rotor shaft 18.

The rotor can then be introduced into the housing body 76 in the way already described via the opening 74 in said housing body, introduction of the rotor body 16 through the opening 74 being followed by introduction into the latter of the flange body 46, the circumferential surface 82 of which is guided, centralized by the inner surface 84 of the flange body receptacle 72, to the final position of the rotor axis 14 in relation to the housing body 76, the insertion of the flange body 46 into the opening 74 being accompanied at the same time by the pins 94 entering the introduction grooves 98 through the introduction opening 100, in order to reach the annular groove 96 via the introduction grooves 98.

Turning the pins 98 in a bayonet-like manner in relation to the annular groove 96 has the effect of fixing the flange body 46 in its axial end position with respect to the rotor axis 14 and further turning of the flange body 46 accompanied at the same time by turning of the sensor board 122 allows the latter to be aligned together with the magnetic field sensors 120 into a specific rotational position in relation to the stator 62 in the motor housing 10, without the position of the flange body 46 in the direction of the rotor axis 14 being changed. Consequently, a final adjustment of the sensor board 122 takes place by the turning of the flange body 46 and final positioning of the flange body 46 in relation to the housing body 76, and consequently also with respect to the stator 62.

Subsequently, fixing of the flange body 46 in the flange body receptacle 72 can take place, for example by adhesive composition 138 being introduced into a gap 140 between the circumferential surface 82 and the inner surface 84. Furthermore, sealing in the region of the ribbon cable 132 passing through the cut-away portion 134 can also take place, with the result that a hermetically sealed termination of the motor housing 10 takes place in the region of the flange body 46 and the led-through ribbon cable 132, accompanied at the same time by permanent fixing of the flange body 46 in relation to the housing body 76 (FIG. 1).

LIST OF REFERENCE NUMERALS 10 motor housing
12 rotor
14 rotor axis
16 rotor body
18 rotor shaft
20 outer surface
22 magnetic poles
24 magnetic poles
26 sensor magnet disk
28 return circuit body
30 rear end face of 16
32 shielding ring
34 first bearing
36 front bearing flange
38 outer bearing ring
40 inner bearing ring
42 continuation
44 second bearing
46 flange body
48 outer bearing ring
50 inner bearing ring
52 continuation
54 resilient ring
56 bearing receptacle
58 hollowing-out
62 stator
64 housing casing
65 embedding composition
66 receptacle
68 aperture
70 front end
72 flange body receptacle
74 opening
76 housing body
78 winding
80 winding terminal
81 embedding composition
82 circumferential surface
84 inner surface
86 interior space
90 first positively connecting features
92 second positively connecting features
94 pins
96 annular groove
98 introduction grooves
100 introduction opening
102 rear side
104 side wall
106 side wall
108 planes
110 planes
112 annular surface
120 magnetic field sensors
122 sensor board
124 front side
126 positioning pins
128 recesses
130 central aperture
132 ribbon cable
134 cut-away portion
136 plug-in connector
138 adhesive composition
140 gap

The invention claimed is:

1. Electric motor, comprising:
a rotor,
a stator,
a motor housing for the rotor and the stator, said rotor being mounted in said housing for rotation about a rotor axis,
a first bearing, disposed on the motor housing on a first side of the rotor and a second bearing, disposed on a second side of the rotor lying opposite the first side, for the rotatable mounting of the rotor about a rotor axis,
the motor housing comprising a housing body, which receives the stator, and a flange body, which receives the second bearing, said flange body being mounted on the housing body such that said flange body is held on the housing body against a movement transversely to the rotor axis,
first connecting elements provided on the flange body and second connecting elements provided on the housing body, said first and second connecting elements being in operative connection with one another when said flange body is in an axial end position, and
said connecting elements are adapted such that, in the axial end position, the flange body can be rotated in relation to the housing body without changing the axial end position.

2. Electric motor according to claim 1, wherein the connecting elements are formed in such a way that they can be brought into engagement with one another by a relative movement with respect to one another in the direction of the rotor axis.

3. Electric motor according to claim 1, wherein the connecting elements are formed in such a way that they can be fixed relative to one another against a movement in the direction of the rotor axis by a turning movement relative to one another about the rotor axis.

4. Electric motor according to claim 2, wherein the connecting elements interact in the manner of a bayonet fastener.

5. Electric motor according to claim 1, wherein one of the connecting elements is formed by path followers and the other of the connecting elements is formed by guide paths for the path followers.

6. Electric motor according to claim 1, wherein a single axial end position of the flange body in relation to the housing body can be fixed by the connecting elements.

7. Electric motor according to claim 1, wherein the flange body can be brought into the axial end position while being guided by guiding elements acting parallel to the rotor axis.

8. Electric motor according to claim 7, wherein the flange body can be inserted into an opening in the housing body.

9. Electric motor according to claim 8, wherein a circumferential surface of the flange body and an inner surface of the opening, facing the flange body, form the guiding elements.

10. Electric motor according to claim 8, wherein the second connecting elements are disposed at the opening in the housing body receiving the flange body.

11. Electric motor according to claim 10, wherein the second connecting elements are disposed in the housing body in the region of an inner surface of the opening, facing the inserted flange body.

12. Electric motor according to claim 8, wherein the first positively connecting elements are disposed on a side of the flange body facing the opening.

13. Electric motor according to claim 12, wherein the first positively connecting elements are disposed on the circumferential surface of the flange body.

14. Electric motor according to claim 8, wherein the opening is an access opening for an interior space of the housing body.

15. Electric motor according to claim 14, wherein the opening in the housing body is dimensioned in such a way that the rotor can be inserted through it into the motor housing.

16. Electric motor according to claim 1, wherein the second bearing is supported in the axial direction on the flange body by means of a resilient element.

17. Electric motor according to claim 1, wherein the flange body has a receptacle for the second bearing, in which the second bearing is movable in the axial direction with respect to the rotor axis in relation to the flange body.

18. Electric motor according to claim 17, wherein the receptacle for the second bearing is formed as a hollowing-out provided in the flange body.

19. Electric motor according to claim 1, wherein the flange body can be fixedly connected to the housing body.

20. Electric motor according to claim 1, wherein the housing body has on a side lying opposite the flange body a bearing flange receiving the first bearing.

21. Electric motor according to claim 20, wherein the bearing flange is connected integrally to a housing casing of the housing body.

22. Electric motor according to claim 1, wherein the housing body is formed from a cured composition embedding the stator.

23. Electric motor comprising:
a rotor,
a stator,
a motor housing for the rotor and the stator, said rotor being mounted in said housing for rotation about a rotor axis,
a first bearing, disposed on the motor housing on a first side of the rotor and a second bearing, disposed on a second side of the rotor lying opposite the first side, for the rotatable mounting of the rotor about a rotor axis,
the motor housing comprising a housing body, which receives the stator, and a flange body, which receives the second bearing, said flange body being mounted on the housing body such that said flange body is held on the housing body against a movement transversely to the rotor axis,
first connecting elements provided on the flange body and second connecting elements provided on the housing body, said first and second connecting elements being in operative connection with one another when said flange body is in an axial end position, and
at least one sensor sensing rotational movements of the rotor disposed on a side of the flange body facing the rotor.

24. Electric motor according to claim 23, wherein the connecting elements are formed in such a way that, in the axial end position, the flange body can be turned in relation to the housing body without changing the axial end position.

25. Electric motor according to claim 23, wherein the at least one sensor is formed as a magnetic field sensor facing sensor magnets of the rotor.

26. Electric motor according to claim 23, wherein a sensor board with the at least one sensor is disposed on a side of the flange body facing the rotor.

27. Electric motor according to claim 25, wherein the sensor board can be simultaneously turned with the flange body.

28. Electric motor according to claim 27, wherein the sensor board is fixedly connected to the flange body.

29. Electric motor according to claim 27, wherein the sensor board is connected to the flange body by means of positively connecting elements.

30. Electric motor according to claim 25, wherein the second bearing is disposed on the flange body on a side of the sensor board facing away from the rotor.

31. Electric motor according to claim 25, wherein a cable leading away from the sensor board is led through a cut-away portion in the flange body.

32. Electric motor according to claim 31, wherein the cut-away portion is open toward an outer side of the flange body.

* * * * *

UNITED STATES PATENT AND TRADEMARK OFFICE
CERTIFICATE OF CORRECTION

PATENT NO. : 7,057,317 B2 Page 1 of 1
APPLICATION NO. : 10/801214
DATED : June 6, 2006
INVENTOR(S) : Kuwert It is certified that error appears in the above-identified patent and that said Letters Patent is hereby corrected as shown below:

Column 12, claim 27, line 24: according to claim --26--.

Column 12, claim 30, line 32: according to claim --26--.

Column 12, claim 31, line 36: according to claim --26--.

Signed and Sealed this

Fifteenth Day of August, 2006

JON W. DUDAS
*Director of the United States Patent and Trademark Office*